(12) United States Patent
Wu et al.

(10) Patent No.: US 10,984,156 B2
(45) Date of Patent: Apr. 20, 2021

(54) MODELLING OF FLUID ELASTICITY EFFECTS ON PROPPANT DYNAMICS

(71) Applicant: Halliburton Energy Services, Inc., Houston, TX (US)

(72) Inventors: Hongfei Wu, Katy, TX (US); Srinath Madasu, Houston, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 622 days.

(21) Appl. No.: 15/742,448

(22) PCT Filed: Aug. 7, 2015

(86) PCT No.: PCT/US2015/044305
§ 371 (c)(1),
(2) Date: Jan. 5, 2018

(87) PCT Pub. No.: WO2017/026995
PCT Pub. Date: Feb. 16, 2017

(65) Prior Publication Data
US 2018/0196905 A1    Jul. 12, 2018

(51) Int. Cl.
*G06F 30/23* (2020.01)
*E21B 43/267* (2006.01)
(Continued)

(52) U.S. Cl.
CPC ............... *G06F 30/23* (2020.01); *C09K 8/62* (2013.01); *E21B 41/00* (2013.01); *E21B 43/267* (2013.01);
(Continued)

(58) Field of Classification Search
CPC .......... G06F 30/23; G06F 9/455; G06F 17/13; G06F 2111/10; C09K 8/62; E21B 41/00; E21B 47/06; E21B 49/00; E21B 43/267
See application file for complete search history.

(56) References Cited

U.S. PATENT DOCUMENTS

| 9,367,653 B2 | 6/2016 | Madasu et al. |
| 2008/0091396 A1 | 4/2008 | Kennon et al. |

(Continued)

FOREIGN PATENT DOCUMENTS

WO    2015/117118 A1    8/2015

OTHER PUBLICATIONS

Zhao Zheng-chao, et al., "Numerical Simulation of Horizontal Migration of Proppant," Journal of Hydrodynamics, pp. 74-80 (2008) (Year: 2008).*

(Continued)

*Primary Examiner* — Rehana Perveen
*Assistant Examiner* — Steven W Crabb
(74) *Attorney, Agent, or Firm* — John W. Wustenberq; Baker Botts L.L.P.

(57) ABSTRACT

In some aspects, a one-dimensional proppant transport flow model represents flow of a proppant-fluid mixture in a subterranean region. The one-dimensional proppant transport flow model includes a fluid momentum conservation model and a proppant bed momentum conservation model that account for viscoelastic effects of the proppant-fluid mixture. The one-dimensional proppant transport flow model may also include a proppant momentum conservation model. In some cases the one-dimensional proppant transport flow model may account for any of settling and resuspension of a proppant bed and interphase momentum transfer between the proppant, proppant bed, and the fluid.

22 Claims, 5 Drawing Sheets

(51) Int. Cl.
E21B 41/00 (2006.01)
G06F 9/455 (2018.01)
C09K 8/62 (2006.01)
E21B 47/06 (2012.01)
E21B 49/00 (2006.01)
G06F 17/13 (2006.01)
G06F 111/10 (2020.01)

(52) U.S. Cl.
CPC .............. *E21B 47/06* (2013.01); *E21B 49/00* (2013.01); *G06F 9/455* (2013.01); *G06F 17/13* (2013.01); *G06F 2111/10* (2020.01)

(56) References Cited

U.S. PATENT DOCUMENTS

| | | | |
|---|---|---|---|
| 2010/0082258 A1* | 4/2010 | Wang | E21B 47/103 702/12 |
| 2014/0290937 A1 | 10/2014 | Crews et al. | |
| 2015/0066446 A1 | 3/2015 | Lin et al. | |
| 2015/0066455 A1 | 3/2015 | Madasu et al. | |
| 2016/0139588 A1* | 5/2016 | Huang | E21B 43/26 700/275 |

OTHER PUBLICATIONS

Nolte, Kenneth G. Reservoir stimulation. Ed. Michael J. Economides. vol. 18. New York: Wiley, 2000.
Patel, P. S., et al. "Analysis of US hydraulic fracturing fluid system and proppant trends." SPE Hydraulic Fracturing Technology Conference. SPE Paper 168645. Society of Petroleum Engineers, 2014.
Acharya, A. Ruma. "Particle transport in viscous and viscoelastic fracturing fluids." SPE Paper 13179. SPE Production Engineering 1.02 (1986): 104-110.
Acharya, A. "Viscoelasticity of crosslinked fracturing fluids and proppant transport." SPE Production Operations Symposium. SPE Paper 16221. Society of Petroleum Engineers, 1987.
Joseph, D. D. "Flow induced microstructure in Newtonian and visoelastic fluids." UMSI research report/University of Minnesota (Minneapolis, MN). Supercomputer institute 99 (1996): 97.
Liu, Yajun. Settling and hydrodynamic retardation of proppants in hydraulic fractures. Diss. 2006.
Malhotra, Sahil. "Role of fluid elasticity and viscous instabilities in proppant transport in hydraulic fractures." (2013).
Wu, H., H. Haj-Hariri, and A. Borhan. "Stability of the shape of a translating viscoelastic drop at low Reynolds number." Physics of Fluids 24.11 (2012): 113101.
Joseph, D. D., et al. "Aggregation and dispersion of spheres falling in viscoelastic liquids." Journal of non-newtonian fluid mechanics 54 (1994): 45-86.
Walters, Harold G., Ronnie G. Morgan, and Phillip C. Harris. "Kinetic rheology of hydraulic fracturing fluids." SPE Annual Technical Conference and Exhibition. SPE Paper 71660. Society of Petroleum Engineers, 2001.
Adachi, J., et al. "Computer simulation of hydraulic fractures." International Journal of Rock Mechanics and Mining Sciences 44.5 (2007): 739-757.
Li, Yongming, et al. "Numerical Simulation Research on Proppant Transport in Hydraulic Fracture." Computational and Information Sciences (ICCIS), 2011 International Conference on. IEEE, 2011.
Meyer, Bruce Roman, and Lucas W Bazan. "A discrete fracture network model for hydraulically induced fractures-theory, parametric and case studies." SPE Hydraulic Fracturing Technology Conference. SPE Paper 140514. Society of Petroleum Engineers, 2011.
Kamp, A. M., and M. Rivero. "Layer modeling for cuttings transport in highly inclined wellbores." Latin American and Caribbean Petroleum Engineering Conference. SPE Paper 53942. Society of Petroleum Engineers, 1999.
Doan, Q., et al. "Sand deposition inside a horizontal well—A simulation approach." Annual Technical Meeting. Petroleum Society of Canada, 1998.
Doan, Q. T., et al. "Modeling of transient cuttings transport in underbalanced drilling (UBD)." SPE Paper 85061. SPE Journal 8.02 (2003): 160-170.
Ramadan, A., et al. "Mechanistic model for cuttings removal from solid bed in inclined channels." Journal of Petroleum Science and Engineering 30.3 (2001): 129-141.
Pratson, Lincoln F., et al. "BANG1D:: a one-dimensional, Lagrangian model of subaqueous turbid surges." Computers & geosciences 27.6 (2001): 701-716.
Wu, Hongfei, Srinath Madasu, and Avi Lin. "A Computational Model for Simulating Proppant Transport in Wellbore and Fractures for Unconventional Treatments." Abu Dhabi International Petroleum Exhibition and Conference. SPE Paper 171739. Society of Petroleum Engineers, 2014.
Huang, P. Y., and J. Feng. "Wall effects on the flow of viscoelastic fluids around a circular cylinder." Journal of non-newtonian fluid mechanics 60.2 (1995): 179-198.
Villone, M. M., et al. "Numerical simulations of particle migration in a viscoelastic fluid subjected to Poiseuille flow." Computers & Fluids 42.1 (2011): 82-91.
Fang, Zhiwu, and Nhan Phan-Thien. "A particle suspension model: an unstructured finite-volume implementation." Journal of non-newtonian fluid mechanics 80.2 (1999): 135-153.
Patankar, N. A., et al. "Lift-off of a single particle in Newtonian and viscoelastic fluids by direct numerical simulation." Journal of Fluid Mechanics 438 (2001): 67-100.
Hwang, Wook Ryol, Martien A. Hulsen, and Han EH Meijer. "Direct simulations of particle suspensions in a viscoelastic fluid in sliding bi-periodic frames." Journal of non-newtonian fluid mechanics 121.1 (2004): 15-33.
Chilcott, M. D., and John M. Rallison. "Creeping flow of dilute polymer solutions past cylinders and spheres." Journal of Non-Newtonian Fluid Mechanics 29 (1988): 381-432.
Roylance, David. "Engineering viscoelasticity." Department of Materials Science and Engineering—Massachusetts Institute of Technology, Cambridge MA 2139 (2001): 1-37.
Bot, E. T. G., M. A. Hulsen, and B. H. A. A. Van den Brule. "The motion of two spheres falling along their line of centres in a Boger fluid." Journal of non-newtonian fluid mechanics 79.2 (1998): 191-212.
Miller, Ryan M., John P. Singh, and Jeffrey F. Morris. "Suspension flow modeling for general geometries." Chemical Engineering Science 64.22 (2009): 4597-4610.
Macosko, Christopher W., Rheology: principles, measurements, and applications. Wiley-vch, 1994.
Herrchen, Markus, and Hans Christian Öttinger. "A detailed comparison of various FENE dumbbell models." Journal of non-newtonian fluid mechanics 68.1 (1997): 17-42.
Tonmukayakul, N., et al. "Dynamic and Steady Shear Properties of Reversibly Cross-Linked Guar Solutions and Their Effects on Particle Settling Behavior." AIP Conference Proceedings. vol. 1027. No. 1. AIP, 2008.
Smith, M. B., et al. "Enhanced 2D Proppant Transport Simulation: The Key To Understanding Proppant Flowback and Post-Frac Productivity." SPE Annual Technical Conference and Exhibition. SPE Paper 38610. Society of Petroleum Engineers, 1997.
Stickel, Jonathan J., and Robert L. Powell. "Fluid mechanics and rheology of dense suspensions." Annu. Rev. Fluid Mech. 37 (2005): 129-149.
Batchelor, George Keith. An introduction to fluid dynamics. Cambridge university press, 2000.
International Search Report and Written Opinion issued in related PCT Application No. PCT/US2015/044305 dated May 3, 2016, 10 pages.
International Preliminary Report on Patentability issued in related PCT Application No. PCT/US2015/044305 dated Feb. 22, 2016, 7 pages.

\* cited by examiner

MODELLING OF FLUID ELASTICITY EFFECTS ON PROPPANT DYNAMICS

CROSS-REFERENCE TO RELATED APPLICATION

The present application is a U.S. National Stage Application of International Application No. PCT/US2015/044305 filed Aug. 7, 2015, which is incorporated herein by reference in its entirety for all purposes.

BACKGROUND

The following description relates to simulating one-dimensional transport of a proppant-fluid mixture using a fluid flow model, for example, in a simulation of a well system fluid in a subterranean region.

Flow models have been used to simulate fluid flow in hydraulic fracture treatments and other environments. During a conventional and/or unconventional fracture treatment of a subterranean reservoir, pressurized fluid is communicated from a wellbore into the reservoir at high pressure, and the pressurized fluid propagates fractures within the reservoir rock. In some cases, the pressurized fluid includes proppant material. Flow models can be used to simulate the flow of proppant-fluid mixtures, for example, within a fracture network.

DESCRIPTION OF DRAWINGS

Like reference symbols in the various drawings indicate like elements.

DETAILED DESCRIPTION

Figure 1:
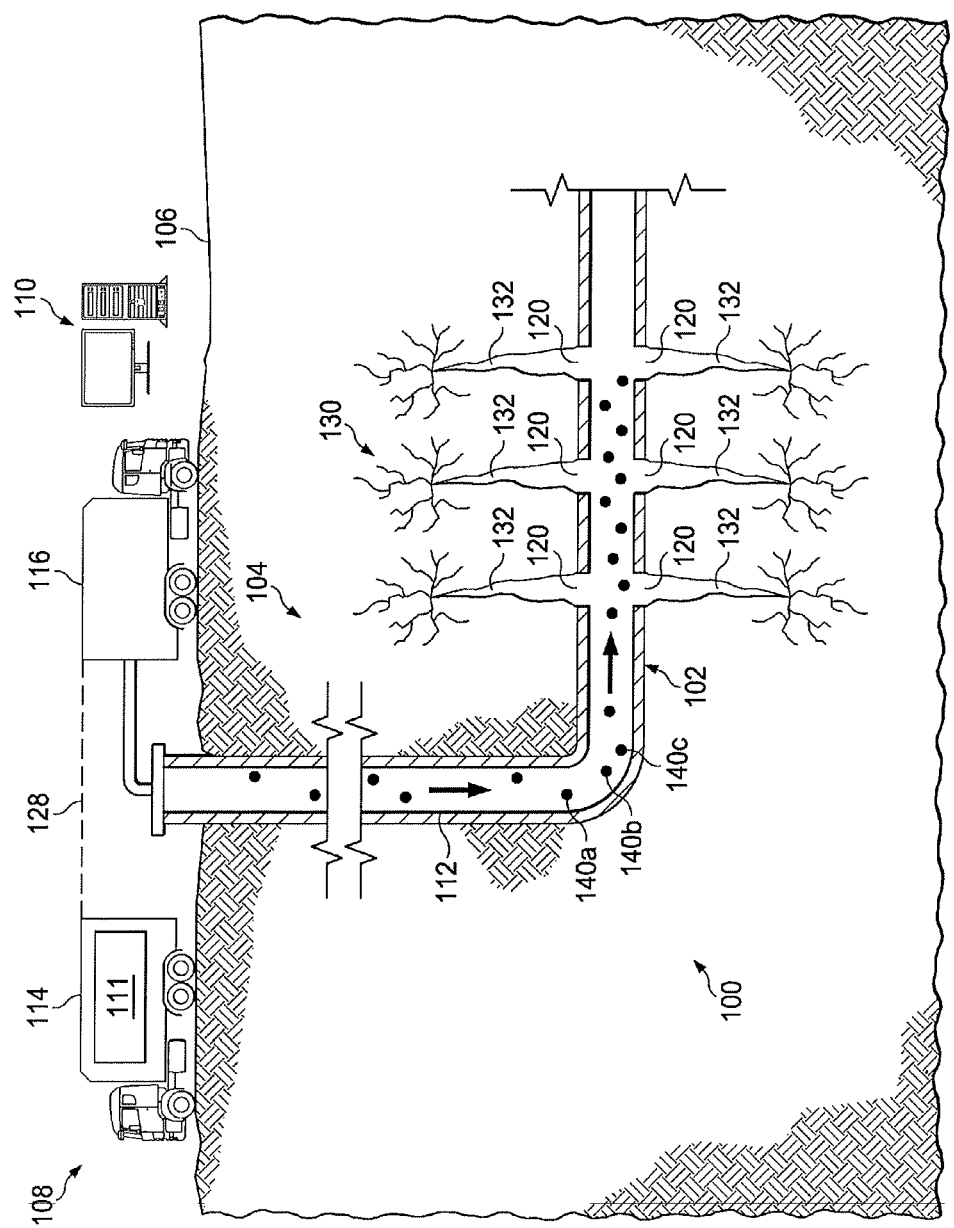
FIG. 1 is a schematic diagram of an example well system.

Fluid flow models can be used to analyze fluid flow, for example, in a well system environment (e.g., in a wellbore, a fracture network, within the reservoir rock matrix, in a well system tool, etc.) or other environments. In some environments, the fluid flow is unsteady and multi-dimensional (e.g., three-dimensional or at least two-dimensional). For example, in some types of fractures where geometry changes rapidly spatially and in time, the dominant flow is two-dimensional, and includes transient behaviors. In some instances, two- or three-dimensional flow can be described by a one-dimensional flow model, for example, by integrating the governing flow equations over the cross-section of the two- or three-dimensional flow path. In some cases, the resulting equations include nonlinear partial differential equations that can be solved using finite difference, finite volume, or finite element methods. In some cases, the use of one-dimensional flow models can reduce computational costs, and allow for faster or more computationally efficient simulations. In some instances, a flow model can be used to perform numerical simulations in real time, for example, during a fracture treatment or during another welt system activity.

In some cases, a fluid flow model simulates the flow of fluid in a fracture, for example, during a hydraulic fracturing treatment, acid fracturing treatment, or other type of injection treatment. As another example, a fluid flow model can model the flow and distribution of proppant in a fracture. Typically, the proppant is a collection of solid particles that are injected into the subterranean formation, such that the solid particles hold (or "prop") open the fractures generated during a hydraulic fracturing treatment. The proppant particles can be mixed with fluid to form a proppant-fluid mixture. In some implementations, the proppant-fluid mixture is a multi-phase fluid that includes solid proppant particles suspended in a liquid medium (e.g., water or a water-based solution, oil or an oil-based solution, etc.). The fluid can include liquids, gels, gases, or a combination of these and other fluid phases. The solid proppant particles can include naturally-occurring particles such as sand grains, or man-made particles such as resin-coated sand or ceramics. Proppant can be selected to have one or more properties, including but not limited to size, sphericity, density, and specific gravity.

Hydraulic fracturing combined with proppant application can improve the conductivity of a hydrocarbon reservoir, and modeling the hydraulic fracturing treatment, including proppant transport, can help to efficiently design, analyze, or optimize the treatment. In some cases, a hydraulic fracturing model combines simulations of fracture propagation, rock deformation, fluid flow, proppant transport, and other phenomena. The fluid flow models used in these and other types of simulations can account for the complex physical environments and conditions.

Some fluid flow models use a finite difference approach for simulating the system. In a typical finite difference approach, the computational geometry domain can be discretely represented by sequence of connected points called "nodes" or "grid points" or "a mesh" (i.e., a collection of nodes and grid points). The nodes can represent locations in one, two, or three dimensions. The nodes need not be uniformly distributed in the computational domain. In some instances, numerical schemes can be optimized or otherwise improved by distributing the nodes in the relevant domain. The nodes can represent discretized locations where simulation variables are calculated.

The simulation variables can be described by governing equations included in the fluid flow model. The governing equations of the fluid flow model can be approximated by discretizing the equations and computing quantities of interest at the nodes, for example, using finite difference operators or other techniques. The governing equations for fluid flow can include momentum conservation equations, mass conservation equations, energy balance equations, or other equations.

In certain applications, the fluid used in the proppant-fluid mixture may exhibit viscoelastic properties. These include, but are not limited to, strain rate dependence, stress relaxation, and creep. Viscoelasticity may have significant effects on a proppant-fluid mixture's flow characteristics as the viscoelastic effects of the fluid affect, among other things, the momentum of the proppant phase, the rate at which proppant in the proppant phase settles to form a proppant bed, and the rate at which proppant becomes resuspended in the proppant phase. Accordingly, accurate simulation and modelling of fluids and proppant-fluid mixtures comprising viscoelastic fluids requires that the viscoelastic effects of the fluid be accounted for.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock (wet or dry) or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the fluid includes a proppant. The proppant can be particles, such as the example proppant particles 140a, 140b, 140c shown in FIG. 1. In some instances, the injection treatment fractures part of a rock formation or other materials in the subterranean region 104. In such examples, fracturing the rock may increase the surface area of the formation, which may increase the rate at which the formation conducts fluid resources to the wellbore 102. In some instances, the proppant particles 140a, 140b, 140c flow into the fractures to hold the fractures open, which may improve the effective permeability of the subterranean region 104.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, deviated wellbores, horizontal wellbores, curved wellbores, or combinations of these and others.

The example injection system 108 includes instrument trucks 114, pump trucks 116, and an injection treatment control subsystem 111. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these. The injection system 108 may inject fluid into the formation above, at or below a fracture initiation pressure for the formation; above, at or below a fracture closure pressure for the formation; or at another fluid pressure.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or combinations of them.

The injection system 108 may also include surface and down-hole sensors to measure pressure, rate, temperature or other parameters of treatment or production activities. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, shape, geometry or aperture. Fractures can extend in any direction or orientation, and they may be formed at multiple stages or intervals, at different times or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), mixtures (e.g., a proppant-fluid mixture), or a combination multiple fluid phases. The flow models can model the flow of fluid in an intersection of flow paths. In some instances, the flow models can model flow in one, two, or three spatial dimensions. The flow models can include nonlinear systems of differential or partial differential equations. The computing subsystem 110 can generate nodes or a mesh for use in the flow models or simulations. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection treatment.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can simulate fluid flow based on the measured data. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the well system 100.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 2:
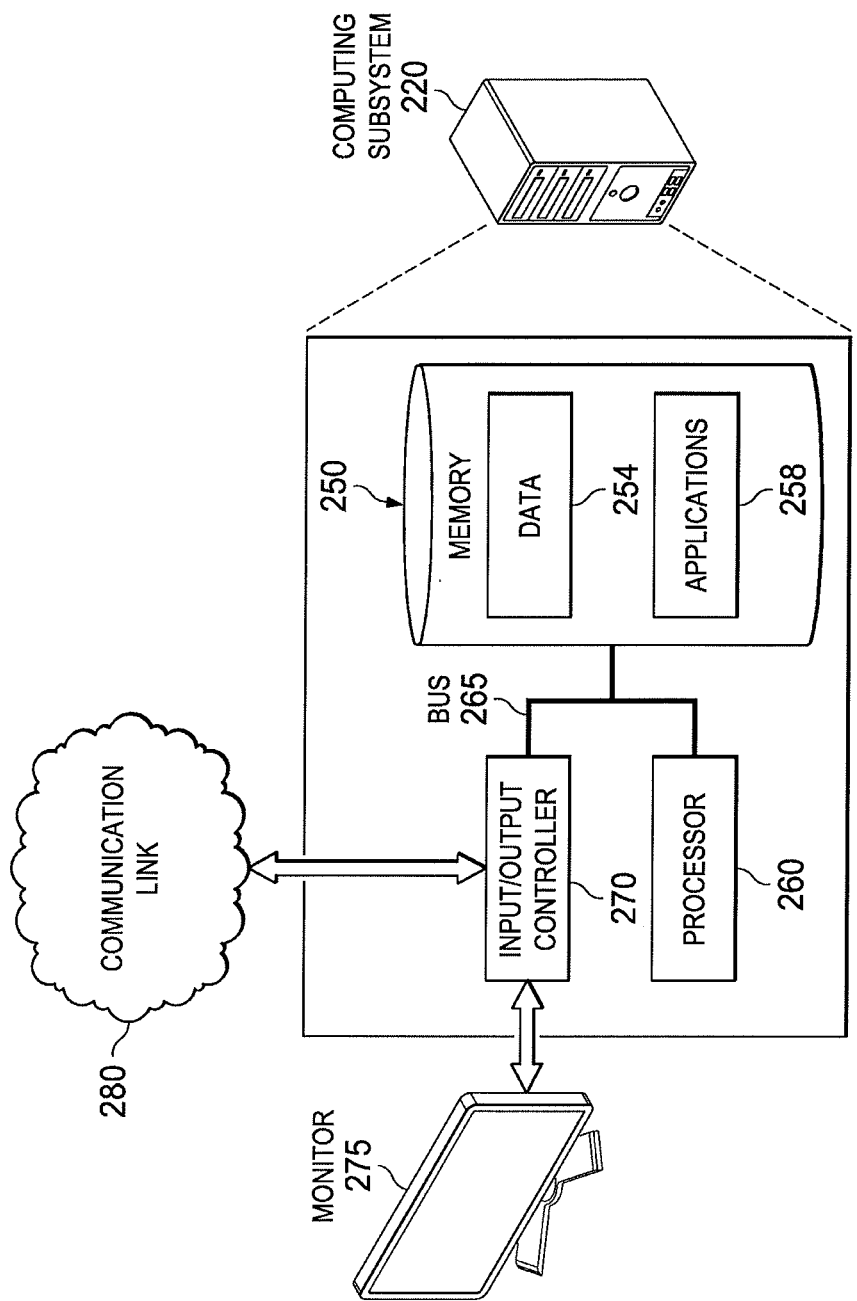
FIG. 2 is a schematic diagram of an example computing system.

FIG. 2 is a diagram of an example computing system 200. The example computing system 200 can operate as the example computing subsystem 110 shown in FIG. 1 (shown as computing subsystem 220 in FIG. 2), or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g. a monitor 275, a mouse, a keyboard, or other input/output devices) and to a communication link 280. The input/output devices can receive or transmit data in analog or digital form over communication links such as a serial link, a wireless link (e.g. infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically-induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, proppants, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-6. For example, the applications 258 can include modules or algorithms for modeling fluid flow in a wellbore. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-6. The input data received by the processor 260 or the output data generated by the processor 260 can include any of the treatment data, the geological data, the fracture data, or any other data.

Figure 3:
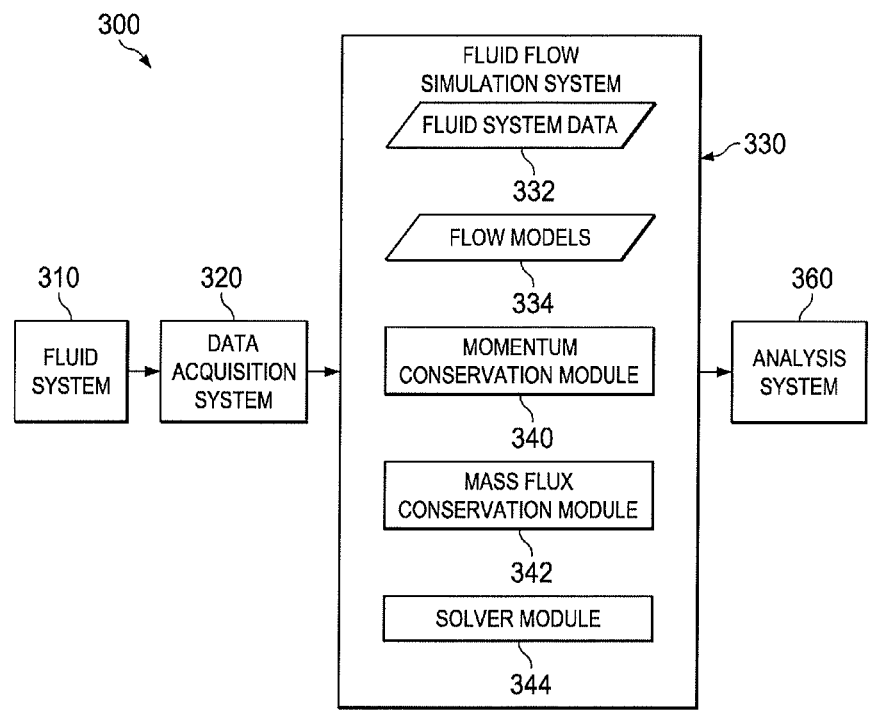
FIG. 3 is a diagram of an example system architecture.

FIG. 3 is a diagram of an example system architecture 300. The example system architecture 300 can be used to model physical phenomena related to a well system environment. For example, the architecture 300 can be used to model fluid flow in an injection treatment of the subterranean region 104 shown in FIG. 1. In some instances, the fluid modeled includes a proppant component. In some instances, the architecture 300 is used to model fluid flow and other aspects of an injection treatment or other activities in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant bi-wing fracture extending from a wellbore, in a natural fracture network, in hydraulically-induced fractures, etc.), or combinations of these and other types of flow paths in a well system environment.

The example architecture 300 shown in FIG. 3 includes a fluid system 310, a data acquisition system 320, a fluid flow simulation system 330, and an analysis system 360. The architecture 300 can include additional or different components or subsystems, and the example components shown in FIG. 3 can be combined, integrated, divided, or configured in another manner. For example, the fluid flow simulation system 330 and the analysis system 360 can be subcomponents of an integrated computing system (e.g., the computing system 200 shown in FIG. 2) or multiple computing systems; or the data acquisition system 320 can be integrated with the fluid system 310. As another example, the fluid flow simulation system 330 or the analysis system 360, or both, can be implemented in a computing system that operates independent of the fluid system 310 or the data acquisition system 320.

The example fluid system 310 can include any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can include the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can include systems or hardware that obtain data from the fluid system 310. For example, the data acquisition system 320 can include flow sensors, pressure sensors, temperature sensors, and other types of measurement devices. The data acquisition system 320 can include communication and data storage systems that store, transfer, manipulate, or otherwise manage the information obtained from the fluid system 310.

The fluid flow simulation system 330 can include one or more computer systems or computer-implemented programs that simulate fluid flow. The fluid flow simulation system 330 can receive information related to the fluid system 310 and simulate fluid flow and other fluid phenomena that occur in the fluid system 310. For example, the fluid flow simulation system 330 can calculate flow velocities, pressures, or other aspects of fluid flow based on data from the data acquisition system 320 or another source.

The example fluid flow simulation system 330 includes fluid system data 332, flow models 334, a momentum conservation module 340, a mass flux conservation module 342, and a solver module 344. The fluid flow simulation system can include additional or different features, and the features of a fluid flow simulation system 330 can be configured to operate in another manner. The modules of the fluid flow simulation system 330 can include hardware modules, software modules, or other types of modules. In some cases, the modules can be integrated with each other or with other system components. In some example implementations, the fluid flow simulation system 330 can be implemented as software running on a computing system, and the modules of the fluid flow simulation system 330 can be implemented as software functions or routines that are executed by the computing system.

The fluid system data 332 can include any information related to the fluid system 310 or another fluid system. For example, the fluid system data 332 can indicate physical properties (e.g., geometry, cross-sectional areas, surface properties, etc.) of one or more flow paths in the fluid system 310; material properties (e.g., density, viscosity, etc.) of one or more fluids, proppants, or proppant-fluid mixtures in the fluid system 310; thermodynamic data (e.g., fluid pressures, fluid temperatures, fluid flow rates, etc.) measured at one or more locations in the fluid system 310; and other types of information. The fluid system data 332 can include information received from the data acquisition system 320 and other sources.

The flow models 334 can include any information or modules that can be used to simulate fluid flow. The flow models 334 can include governing equations, spatial and temporal discretization data, or other information. The flow models 334 can include a proppant transport flow model to simulate proppant flow. In some examples, the flow models 334 include governing flow equations, such as, for example, the Navier-Stokes equation or related approximations of the Navier-Stokes equation, diffusion-convection equations, continuity equations, or other types of flow equations. As an example, the flow models 334 may include any equations below, or the flow models 334 may include additional or different governing flow equations.

The flow models 334 can include spatial discretization data, such as, for example, discrete nodes that represent locations of fluid flow along flow paths in the fluid system 310. Generally, the flow models 334 can represent any number of intersecting flow path branches, including any type of flow path intersection. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

The spatial discretization of the flow paths can be implemented by any suitable algorithm. For example, the system can be discretized according to a finite difference model, a finite volume model, finite element model, or another technique. The system can be discretized in a manner that permits spatial derivatives or partial spatial derivatives to be solved in the discretized spatial domain using numerical methods. The system can be discretized in a manner that also permits time derivatives or partial time derivatives to be solved in the discretized temporal domain using numerical methods.

As shown in FIG. 3, the fluid flow simulation system 330 can also include a momentum conservation module 340. The momentum conservation module 340 can include any information or modules that can be used to model momentum conservation in a fluid flow model. For example, the momentum conservation module 340 can balance axial momentum in an axial flow direction against dynamic changes in a transverse momentum. In some instances, the momentum conservation module 340 models proppant momentum, fluid momentum, or the momentum of a proppant-fluid mixture.

As shown in FIG. 3, the fluid flow simulation system 330 can also include a mass flux conservation module 342. The mass flux conservation module 342 can include any information or modules that can be used to model mass flux conservation in a fluid flow model.

Either of the momentum conservation module 340 and the mass flux conservation module 342 may account for a proppant bed that may be present or otherwise develop along the flow path. For example, in some cases, momentum conservation module 340 and the mass flux conservation module 342 may account for a proppant bed height or the settling velocity of a proppant in a proppant-fluid mixture when modelling the dynamics of the flow of a fluid, a proppant flow, or a proppant-fluid mixture. In some cases, the momentum conservation module 340 and the mass flux conservation module 342 can also be used to model the momentum conservation and mass flux conservation of the proppant bed.

The solver 344 can include any information or modules that can be used to solve a system of equations. For example, the solver 344 may be a direct solver, an iterative solver, or a different type of solver. In some implementations, the solver 344 receives inputs from the other components of the fluid flow simulation system 330. For example, the inputs can include the discretized governing flow equations, information from momentum conservation module 340 or mass flux conservation module 342, the fluid system data 332, or any other information. The inputs can also include data generated or reported from a separate simulation or model. The solver 344 can generate a numerical solution for a variable of interest based on the inputs. The solution can be generated for some or all of the grid points in a discretized spatial domain. For example, the solver 344 may calculate values of fluid velocity, fluid pressure, or another variable over a spatial domain; the values can be calculated for an individual time step or multiple time steps.

The analysis system 360 can include any systems, components, or modules that analyze, process, use, or access the simulation data generated by the fluid flow simulation system 330. For example, the analysis system 360 can be a real time analysis system that displays or otherwise presents fluid data (e.g., to a field engineer, etc.) during an injection treatment. In some cases, the analysis system 360 includes other simulators or a simulation manager that use the fluid simulation data to simulate other aspects of a well system. For example, the analysis system 360 can be a fracture simulation suite that simulates fracture propagation based on the simulated fluid flow data generated by the fluid flow simulation system 330. As another example, the analysis system 360 can be a reservoir simulation suite that simulates fluid migration in a reservoir based on the simulated fluid flow data generated by the fluid flow simulation system 330.

Figure 4:
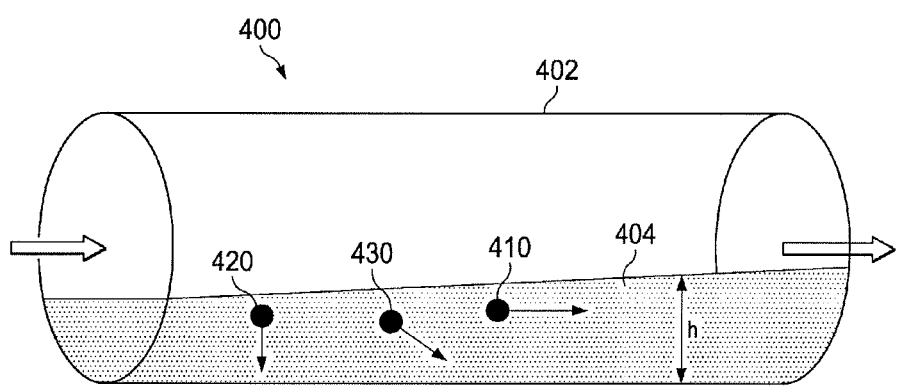
FIG. 4 is a diagram of an example fluid channel with settled proppant.

FIG. 4 is diagram of an example wellbore environment 400. The wellbore environment 400 includes an example wellbore 402. The wellbore 402 can be substantially similar to the wellbore 102 shown in FIG. 1. The wellbore 402 can contain fluid such as a fracturing fluid, a proppant-fluid mixture, or other fluid. The example wellbore 402 can transport proppant, shown in FIG. 4 by example proppant particles 410, 420, and 430. The wellbore 402 shown in FIG. 4 is an example of a flow path for a proppant-fluid mixture in a well system environment; other flow paths for proppant-fluid mixtures in a well system environment may have the same, similar, or different features.

Proppant particles flowing in a flow path can have an axial momentum with a velocity in the direction of axial flow, as shown by particle 410. The axial flow direction is the primary flow direction of the proppant-fluid mixture. For example, the axial flow direction can be defined by the long dimension of the flow path. In some cases, the fluid can develop eddy currents that include transverse flow components, or the individual proppant particles can move in a transverse direction, while the bulk proppant-fluid mixture moves primarily in the axial direction. In a one-dimensional flow model, the spatial dimension of the model can be defined as the axial flow direction. Proppant particles can also have a transverse momentum component, corresponding to a velocity that is perpendicular to the axial flow, as shown by particle 420. Proppant particles can generally have a momentum that is a combination of axial and transverse components, as shown by particle 430. Transverse momentum can be imparted on a particle, for example, by gravity, pressure variations, temperature variations, flow path geometry, or a combination of these and other aspects of the flow environment. Many particles can settle at the bottom of a flow path, forming a layer of particles, such as settled proppant layer 404 shown in FIG. 4.

As discussed above, a layer of settled proppant, i.e., a proppant bed, can be present or develop as a result of proppant flowing along the flow path. The proppant bed can reduce the volume of the flow path through which a fluid can freely flow. Thus, a flow path with a proppant bed can have an effective cross section for free flow that is less than the total cross-section of the flow path. The effective cross section of the flow path need not be constant along the length of the flow path. Thus, the effective cross-section of the flow path can depend on the height of the proppant bed, which can vary along the length or cross-section of the flow path. The proppant bed height of the flow path can also change dynamically over time as a result of proppant settling and resuspension.

As previously discussed, fluid flow simulation systems in accordance with this disclosure may simulate flow of a proppant-fluid mixture by solving a system of simultaneous equations. An example of such a system of equations follows. The following fluid flow simulation system is intended merely to illustrate one example of a fluid flow simulation system in accordance with this disclosure. A person of skill in the art would appreciate that the following system may be modified or supplemented for different applications. For example, certain applications may rely on different equations that account for different flow path geometries. As another example, the system described below assumes an isothermal system. In other embodiments, the system may be treated as adiabatic and further include equations accounting for heat flow and changes in temperature.

The current example of a fluid flow simulation system is directed to simulating the flow of a proppant-fluid mixture comprising a fluid having viscoelastic properties and a proppant. In this example, conservation of mass flux and momentum of the fluid is governed by the following equations:

$$\frac{\partial}{\partial t}[\rho^{(f)}A(1-\phi)] + \frac{\partial}{\partial x}[\rho^{(f)}A(1-\phi)u^{(f)}] + \dot{m}^{(f)} = 0 \quad (1)$$

$$\frac{\partial}{\partial t}(\rho^{(f)}A(1-\phi)u^{(f)}) + \frac{\partial}{\partial x}[\rho^{(f)}A(1-\phi)(u^{(f)})^2] + \quad (2)$$
$$A(1-\phi)\frac{\partial p}{\partial x} - \frac{\partial}{\partial x}[A(1-\phi)\sigma_{xx}^{(f)}] + \rho^{(f)}A(1-\phi)f^{(f)} - $$
$$\rho^{(f)}A(1-\phi)g\cos\theta + u^{(f)}\dot{m}^{(f)} - \tau^{(fp)} - \tau^{(fb)} = 0$$

where Equation (1) represents conservation of mass flux (i.e., mass continuity) and Equation (2) represents momentum conservation. Equations (1) and (2) introduce several variables, including: axial displacement along the flow path x; time t; density of the fluid $\rho^{(f)}$; the effective cross-sectional area of the flow path A; the proppant volume fraction of the proppant-fluid mixture $\phi$ (accordingly, $1-\phi$ represents the fluid volume fraction of the proppant-fluid mixture); the fluid's velocity $u^{(f)}$; and the fluid's mass flux caused by settling and resuspension of the proppant phase $\dot{m}^{(f)}$. For purposes of this example, settling and resuspension of the proppant phase is considered to occur in a direction normal to the direction of flow, i.e., normal to the x-direction. Equation (2), further introduces the following variables: pressure p; the fluid's viscoelastic stress component in the direction of the flow path $\sigma_{xx}^{(f)}$; fluid friction losses $f^{(f)}$; the flow path's inclination angle with respect to gravity $\theta$; shearing forces between the fluid and the proppant phase $\tau^{(fp)}$; and shearing forces between the fluid and the proppant bed $\tau^{(fb)}$. Equation (2) also includes a constant g representing acceleration due to gravity.

Conservation of mass flux and momentum of the proppant phase are governed by the following equations:

$$\frac{\partial}{\partial t}(\rho^{(p)}A\phi) + \frac{\partial}{\partial x}(\rho^{(p)}A\phi u^{(p)}) + \dot{m}^{(p)} = 0 \quad (3)$$

$$\frac{\partial}{\partial t}(\rho^{(p)}A\phi u^{(p)}) + \frac{\partial}{\partial x}[\rho^{(p)}A\phi(u^{(p)})^2] + \quad (4)$$
$$A\phi\frac{\partial p}{\partial x} - \rho^{(p)}A\phi g\cos\theta + u^{(p)}\dot{m}^{(p)} + \tau^{(fp)} - \tau^{(pb)} = 0$$

where Equation (3) governs the conservation of mass flux of the proppant and equation (4) governs the conservation of momentum of the proppant. Equation (3) further introduces the following variables: proppant phase density $\rho^{(p)}$; proppant phase velocity $u^{(p)}$; and proppant phase mass flux induced by settling and resuspension of the proppant phase $\dot{m}^{(p)}$. Equation (4) further introduces shearing force between the proppant phase and the proppant bed $\tau^{(pb)}$.

Similarly, conservation of mass flux and momentum of the proppant bed phase are governed by the following equations:

$$\frac{\partial}{\partial t}(A^{(b)}\rho^{(b)}) + \frac{\partial}{\partial x}(\rho^{(b)}A^{(b)}u^{(b)}) - (\dot{m}^{(f)} + \dot{m}^{(p)}) = 0 \quad (5)$$

$$\frac{\partial}{\partial t}(\rho^{(b)}A^{(b)}u^{(b)}) + \frac{\partial}{\partial x}[\rho^{(b)}A^{(b)}(u^{(b)})^2] + A^{(b)}\frac{\partial p}{\partial x} - \frac{\partial}{\partial x}(A^{(b)}\sigma_{xx}^{(b)}) + \quad (6)$$
$$\rho^{(b)}A^{(b)}f^{(b)} - \rho^{(b)}A^{(b)}g\cos\theta - u^{(b)}(\dot{m}^{(f)} + \dot{m}^{(p)}) + \tau^{(fb)} +$$
$$\tau^{(pb)} + \rho^{(b)}[(1-\phi)u^{(f)} + \phi u^{(p)}]\left[(1-\phi)\frac{\rho^{(f)}}{\rho^{(p)}}\right]v_{settling} = 0$$

where Equation (5) governs the conservation of mass flux of the proppant bed and Equation (6) governs the conservation of momentum of the proppant bed. Equation (5) introduces the following variables: proppant bed density $\rho^{(b)}$; proppant bed cross-sectional area $A^{(b)}$; and proppant bed velocity $u^{(b)}$. Equation (6) further introduces: viscoelastic stress effects in the flow direction $\sigma_{xx}^{(b)}$; and proppant bed friction losses $f^{(b)}$. The proppant bed conservation model described by Equation (6) accounts for the effects of the axial interphase shearing force along the flow path induced by each of resuspension of the proppant phase and settling of the proppant phase, as well as momentum transfer between the proppant phase and the proppant bed due to proppant impinging the proppant bed.

In addition to Equations (1) to (6), the example system further includes equations defining geometric relationships of the flow path. These include equations defining the relationship between the flow path effective area A, the cross-section area of the proppant bed $A^{(b)}$, and the proppant height h:

$$A^{(b)} + A = \pi R^2 \qquad (7)$$

$$A^{(b)} = R^2 \cos^{-1}\left(\frac{R-h}{R}\right) - (R-h)\sqrt{R^2 - (R-h)^2} \qquad (8)$$

Equations (7) and (8), introduce the radius of the flow path R. For purposes of this example, Equations (7) and (8) assume that the flow path is circular, such as a flow path defined by a circular pipe. A person of skill in the art would appreciate that the flow path may be non-circular. In cases where the flow path is non-circular, Equations (7) and (8) and any other equations discussed in this example that include geometric parameters of the flow path may be substituted with suitable equations based on the alternate geometry.

In the current example, Equations (1) through (8) are used to compute the following eight independent variables: fluid velocity $u^{(f)}$; proppant velocity $u^{(p)}$; proppant bed velocity $u^{(b)}$; pressure p; volume fraction of proppant $\phi$; effective cross-sectional area of the flow path A; cross-sectional area of the proppant bed $A^{(b)}$; and the settling proppant height h. To mathematically close the system, physical models are used to determine: fluid viscoelastic stress in the direction of the flow path $\sigma_{xx}^{(f)}$; the proppant bed viscoelastic stress in the direction of the flow path $\sigma_{xx}^{(b)}$; fluid mass flux $\dot{m}^{(f)}$; proppant phase mass flux $\dot{m}^{(p)}$; fluid friction losses $f^{(f)}$; proppant bed friction losses $f^{(b)}$; shear force between the fluid and the proppant phase $\tau^{(fp)}$; shear force between the fluid and the proppant bed $\tau^{(fb)}$; shear force between the proppant phase ad the proppant bed $\tau^{(pb)}$; proppant bed density $\rho^{(b)}$; proppant bed viscosity $\mu^{(b)}$; and proppant volume fraction in the proppant bed $\phi^{(b)}$. Exemplary physical models that may be used to compute these variables are described below in more detail.

The current example implements a viscoelastic model to the viscoelastic behavior of the fluid and the proppant bed. The current example relies on Maxwell's model of viscoelasticity which approximates a viscoelastic material as a purely viscous damper serially connected to a purely elastic spring. In other embodiments, other models of viscoelasticity, including the Zener model and the Kelvin-Voight model, may be implemented instead of or in addition to Maxwell's model.

A one-dimensional version of Maxwell's model of viscoelasticity is given by Equation (9):

$$\sigma_{xx} + \lambda \frac{\partial \sigma_{xx}}{\partial t} = \mu \frac{\partial u}{\partial x} \qquad (9)$$

Equation (9) introduces relaxation time $\lambda$, viscosity $\mu$, stress in the direction of the flow path $\sigma_{xx}$, and velocity u. Equation (9) may be used to model the viscoelastic effects by substituting the appropriate variables. Specifically, to model viscoelastic effects of the fluid, stress in the direction of the flow path $\sigma_{xx}$ and velocity u are substituted with fluid stress in the direction of the flow path $\sigma_{xx}^{(f)}$ and fluid velocity $u^{(f)}$, respectively. Similarly, to model viscoelastic effects of the proppant bed, stress in the direction of the flow path $\sigma_{xx}$ and velocity u are substituted with proppant bed stress in the direction of the flow path $\sigma_{xx}^{(b)}$ and proppant bed velocity $u^{(b)}$, respectively.

The current example further includes physical models of the mass flux of each of the fluid and the proppant phase:

$$\dot{m}^{(f)} = \Phi^{(f)} \times 2\sqrt{R^2 - (R-h)^2} \qquad (10)$$

$$\dot{m}^{(p)} = \Phi^{(p)} \times 2\sqrt{R^2 - (R-h)^2} \qquad (11)$$

where Equation (10) models the fluid mass flux due to settling and resuspension of the proppant phase $\dot{m}^{(f)}$ and Equation (11) models the proppant phase mass flux due to settling and resuspension of the proppant phase $\dot{m}^{(p)}$.

In Equations (10) and (11), $\Phi^{(f)}$ and $\Phi^{(p)}$ represent the fluid and proppant mass fluxes across the proppant-fluid interface per unit length, respectively. The relationship between $\Phi^{(f)}$ and $\Phi^{(p)}$ may be represented by the following equation:

$$\Phi^{(f)} = \frac{1 - \phi^{(b)}}{\phi^{(b)}} \frac{\rho^{(f)}}{\rho^{(p)}} \Phi^{(p)} \qquad (12)$$

The proppant mass flux $\Phi^{(p)}$ across the interfacial plane per unit length is the superposition of the proppant settling and resuspension effects can be given as follows:

$$\Phi^{(p)} = \rho^{(p)} \lfloor \phi v_\phi - \phi^{(b)} u_\tau H(h) \rfloor \sin\theta \qquad (13)$$

In Equation (13), H(h) is the Heaviside function, $v_{settling}$ is the proppant phase settling velocity taking into account the proppant concentration and fluid viscoelasticity effect, and $u_\tau$ is the friction velocity causing resuspension.

The current example assumes that the proppant settling velocity, $v_{settling}$, is affected by the concentration of particles in the proppant-fluid mixture. Accordingly, the proppant settling velocity, $v_{settling}$, is modeled in a manner that takes into account the concentration of particles in the particle-fluid mixture. One such model is provided by the following equation:

$$v_{settling} = v_{s,VE} e^{-a\phi} \qquad (14)$$

Equation (14) introduces an experimentally determined parameter accounting for the proppant concentration effect a, and the single proppant settling velocity in the fluid $v_{s,VE}$. $v_{s,VE}$ is further related to the Stoke's velocity $v_s$ (i.e., the terminal velocity of a sphere of proppant in a viscous fluid) according to the following equations:

$$v_{s,VE} = \begin{cases} v_s[1 - \alpha_1(ReDe)^{\beta_1}]^{-\frac{1}{2}} & \text{when } De < 1.0 \\ v_s[1 + \alpha_2(ReDe)^{\beta_2}]^{-\frac{1}{2}} & \text{when } De \geq 1.0 \end{cases} \qquad (15)$$

-continued $$v_s = \sqrt{\frac{4}{3C_D}\frac{(\rho^{(p)} - \rho^{(f)})gd}{\rho^{(f)}}} \qquad (16)$$

where Equations (15) and (16) introduce: experimentally determined fluid viscoelasticity parameters $\alpha_1$, $\alpha_2$, and $\beta_2$; drag coefficient $C_D$ for a single spherical particle settling in an unbound viscous medium; particle-based Reynolds number of the fluid Re; and Deborah number De. $Re^{(f)}$ and De are defined by the following equations:

$$Re = \frac{\rho^{(f)}dv_s}{\mu^{(f)}} \qquad (17)$$

$$De = \frac{\lambda v_s}{d} \qquad (18)$$

where Equations (17) and (18) further introduce the equivalent spherical diameter, d, of the proppant particle.

Referring back to Equation (13), in the current example, friction velocity $u_\tau$, is assumed to be proportional to the velocity difference between the proppant fluid mixture and the proppant bed. Specifically, the current example models the friction velocity $u_\tau$ as follows:

$$u_\tau = \sqrt{\frac{f^{(m)}}{2}}(u^{(m)} - u^{(b)}) \qquad (19)$$

Equation (19) introduces proppant-fluid mixture friction factor $f^{(m)}$ and proppant-fluid mixture velocity $u^{(m)}$. These parameters may in turn be modelled by the following equations:

$$f_m = \begin{cases} \dfrac{64}{Re^{(m)}} & Re^{(m)} \le Re_T \\ 0.079(Re^{(m)})^{-0.25} & Re^{(m)} > Re_T \end{cases} \qquad (20)$$

$$u^{(m)} = (1 - \phi)u^{(f)} + \phi u^{(p)} \qquad (21)$$

where Equation (20) further introduces the Reynolds number of the proppant-fluid mixture $Re^{(m)}$ and the transition (or critical) Reynolds number $Re_T$, i.e., the Reynolds number below which flow is laminar and above which flow becomes turbulent. In the current example, the Reynolds number of the fluid-proppant mixture $Re^{(m)}$ is calculated using the following equation:

$$Re^{(m)} = \frac{u^{(m)}D^{(m)}\rho^{(m)}}{\mu^{(m)}} \qquad (22)$$

where Equation (22) introduces: the wetted diameter of the proppant-fluid mixture $D^{(m)}$; density of the proppant-fluid mixture $\rho^{(m)}$; and viscosity of the proppant-fluid mixture $\mu^{(m)}$. Each of these is further calculated using Equations (23), (24), and (25), respectively:

$$D^{(m)} = 2\pi R - 2R\cos^{-1}\left(\frac{R-h}{R}\right) + 2\sqrt{R^2 - (R-h)^2} \qquad (23)$$

$$\rho^{(m)} = (1 - \phi)\rho^{(f)} + \phi\rho^{(p)} \qquad (24)$$

$$\mu^{(m)} = \mu_{eff}\left(1 - \frac{\phi}{\phi_c}\right)^{-2} \qquad (25)$$

Equation (23) for $D^{(m)}$ is based on flow through a circular flow path. As previously discussed, a suitable substitute equation for Equation (23) may be used for non-circular flow paths. Equation (25) further introduces a packing factor $\phi_c$, which provides an upper bound for the proppant in the proppant bed. The value of $\phi_c$ depends on the proppant packing pattern. For example, if the proppant bed follows a simple cubic arrangement of monomodal spheres, $\phi_c$ may be assigned a value of 0.74. Other examples of arrangements include hexagonal close-packed ($\phi_c$=0.524) and random close-packed ($\phi_c$~0.63).

Equation (25) introduces effective viscosity of the proppant-fluid mixture $\mu_{eff}$, which is calculated using Equation (26):

$$\mu_{eff} = \frac{d^2 g(\rho^{(p)} - \rho^{(f)})}{36 v_{s,VE}} \qquad (26)$$

The current example further includes a friction loss model to model friction losses in the fluid and the proppant bed. The fluid friction loss coefficient $f^{(f)}$, is modelled according to Equation (27):

$$f^{(f)} = \begin{cases} \dfrac{64}{Re^{(f)}}\dfrac{1}{2}\dfrac{(u^{(f)})^2}{D^{(f)}} & Re^{(f)} \le Re_T \\ 0.079(Re^{(f)})^{-0.25}\dfrac{1}{2}\dfrac{(u^{(f)})^2}{D^{(f)}} & Re^{(f)} > Re_T \end{cases} \qquad (27)$$

Equation (27) introduces the wetted diameter of the fluid $D^{(f)}$. The fluid Reynolds number $Re^{(f)}$ and the wetted diameter of the fluid $D^{(f)}$ may be calculated by Equations (28) and (29), respectively:

$$Re^{(f)} = \frac{\rho^{(f)}D^{(f)}u^{(f)}}{\mu^{(f)}} \qquad (28)$$

$$D^{(f)} = D^{(m)} \qquad (29)$$

The current example further models the proppant bed friction loss coefficient according to the following equation:

$$f^{(b)} = \begin{cases} \dfrac{64}{Re^{(b)}}\dfrac{1}{2}\dfrac{(u^{(b)})^2}{D^{(b)}} & Re^{(b)} \le Re_T \\ 0.079(Re^{(b)})^{-0.025}\dfrac{1}{2}\dfrac{(u^{(b)})^2}{D^{(b)}} & Re^{(b)} > Re_T \end{cases} \qquad (30)$$

Equation (30) introduces the Reynolds number of the proppant bed $Re^{(b)}$ and the wetted diameter of the proppant bed $D^{(b)}$. These variables are calculated using Equations (31) through (34), respectively:

$$Re^{(b)} = \frac{\rho^{(b)} D^{(b)} u^{(b)}}{\mu^{(b)}} \quad (31)$$

$$\rho^{(b)} = \rho^{(f)}(1 - \phi^{(b)}) + \rho^{(p)}\phi^{(b)} \quad (32)$$

$$\mu^{(b)} = \mu_{eff}\left(1 - \frac{\phi^{(b)}}{\phi_c}\right)^{-2} \quad (33)$$

$$D^{(b)} = 2R\cos^{-1}\left(\frac{R-h}{R}\right) + 2\sqrt{R^2 - (R-h)^2} \quad (34)$$

Equation (33) introduces the viscosity of the proppant bed $\mu^{(b)}$. For purposes of Equation (34), the flow path is assumed to be circular, however, a suitable substitute equation for Equation (34) may be used for non-circular or combined flow paths.

Finally, the current example includes physical models for interphase shearing forces. Specifically, the current example accounts for shear force between the fluid and the proppant phase $\tau^{(fp)}$, shear force between the fluid and the proppant bed $\tau^{(fb)}$, and shear\force between the proppant phase and the proppant bed $\tau^{(pb)}$. These shear forces are determined according to Equations (35), (36), and (37), respectively:

$$\tau^{(fp)} = \frac{C_D}{2d\frac{\rho^{(p)}}{\rho^{(f)}}} \frac{3}{4}\phi(1-\phi)^{-B}\rho^{(f)}|u^{(f)} - u^{(p)}|(u^{(f)} - u^{(p)})A \quad (35)$$

$$\tau^{(fb)} = (1-\phi)\frac{f^{(m)}}{2}\rho^{(m)}(u^{(m)} - u^{(b)})^2 \frac{A^{(b)}}{D^{(b)}} \quad (36)$$

$$\tau^{(pb)} = \phi\frac{f^{(m)}}{2}\rho^{(m)}(u^{(m)} - u^{(b)})^2 \frac{A^{(b)}}{D^{(b)}} \quad (37)$$

Equation (36) introduces an experimentally determined parameter, B, for modifying the shear force between the fluid and proppant considering the effect of the proppant concentration.

Taken together and in combination with experimental, geometric, and other data, Equations (1) to (37) provide one example of a system of equations that may be used to model one-dimensional flow of a proppant-fluid mixture, including the effects of viscoelasticity and settling and resuspension of a proppant bed.

Figure 5:
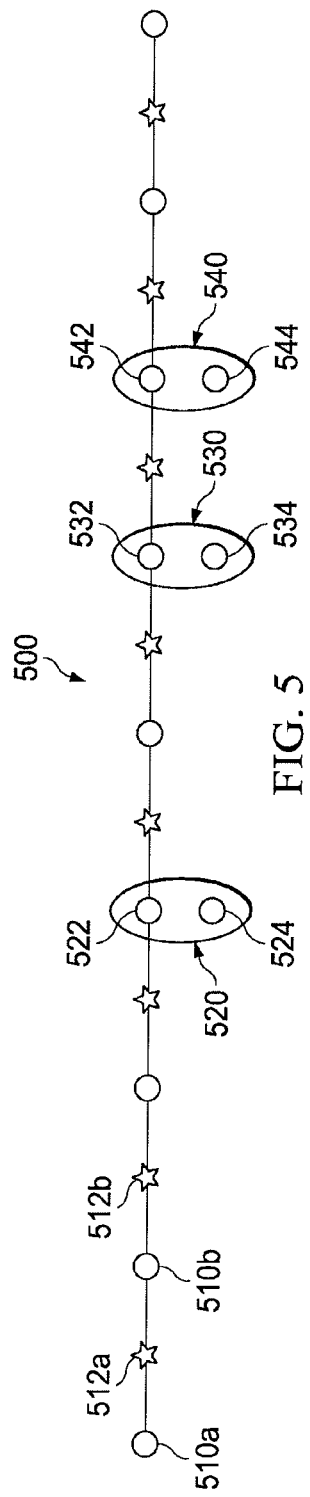
FIG. 5 is a diagram showing an example flow path with nodes.

FIG. 5 is a diagram showing aspects of an example proppant transport flow model 500. The example proppant transport flow model 500 is based on a nodal discretization of a fluid flow model of a wellbore in a subterranean environment. The proppant transport flow model 500 can model proppant-fluid mixture flow in a wellbore with perforations, such as, for example, in the example well system shown in FIG. 1. The example fluid flow model 500 includes multiple nodes such as nodes 510a, 510b, 522, 524, 532, 534, 542, and 544. The example fluid flow model 500 also includes staggered points such as staggered points 512a, 512b.

Discontinuities at perforations can be represented by groups of nodes. For example, perforation 520 is represented by a group of nodes 522 and 524, perforation 530 by a group of nodes 532 and 534, and perforation 540 by a group of nodes 542 and 544. A flow path in a one-dimensional flow model can include any number of nodes, groups of nodes, staggered points, or perforations. In some cases, nodes and staggered points represent locations where fluid flow values (e.g. pressure, flow velocity, momentum) are calculated in simulations of the proppant transport fluid flow model 500. The variables are collocated at the nodes (e.g. nodes 510a, 510b). Continuity, momentum and energy equations are solved at the staggered points (e.g. points 512a, 512b). The nodes, staggered points, or perforations can be distributed uniformly or non-uniformly. A staggered grid approach can be used as shown in FIG. 5 that can avoid collocated pressure-velocity coupling in the model that can cause computational instabilities.

In some example one-dimensional models, fluid flow to the formation at perforations can create discontinuities in calculated variables. For example, the one-dimensional model described herein can capture the behavior of velocity discontinuities at perforations. The discontinuities can be modeled in the one-dimensional model by using two nodes collocated at each perforation, one node representing an upstream node and the other node representing a downstream node. For example, one node at a perforation can represent a portion of a fluid's velocity, and the other node can represent the remaining velocity. For another example, at perforation 520, the volume fraction and temperature at the downstream node is set equal to the volume fraction and temperature at the upstream node since the volume fraction and temperature are continuous at the perforations even when the velocity may have a discontinuity. The proppant mass and energy flux at each upstream node can be functions of the upstream node variables. The fluxes are not limited to upstream variables, and average fluxes can be computed. At each perforation, the continuity equation at each staggered point is solved at the downstream node.

The model can apply boundary conditions at inlets, outlet, or perforations. For example, the inlet velocity can replace the continuity equation at the inlet (e.g. node 510a) and the pressure at the perforation can replace the momentum equation at the perforation locations (e.g. perforations 520, 530, 540). The boundary conditions for volume fraction and temperature can be computed at other perforations. In some instances, the volume fraction and temperature boundary conditions are not computed at the last perforation (i.e., the most downstream perforation). For example, in FIG. 5, the last perforation is perforation 540. At the last perforation, in some cases, the volume fraction and temperature flux at the upstream node are calculated as a function of the upstream node variables. All the remaining fluid from the second-to-last perforation (e.g., perforation 530) can leave from the upstream node at the last perforation (e.g., perforation 540) to the formation. Thus, in some cases, no fluid enters the downstream node of the last perforation. The example model can consider the boundary condition that no fluid exists at the downstream node of the last perforation, and thus at the downstream node of the last perforation the volume fraction can be set to zero and the temperature can be set to the initial or ambient temperature. This example model approach can handle both positive and negative flows in the wellbore.

Figure 6:
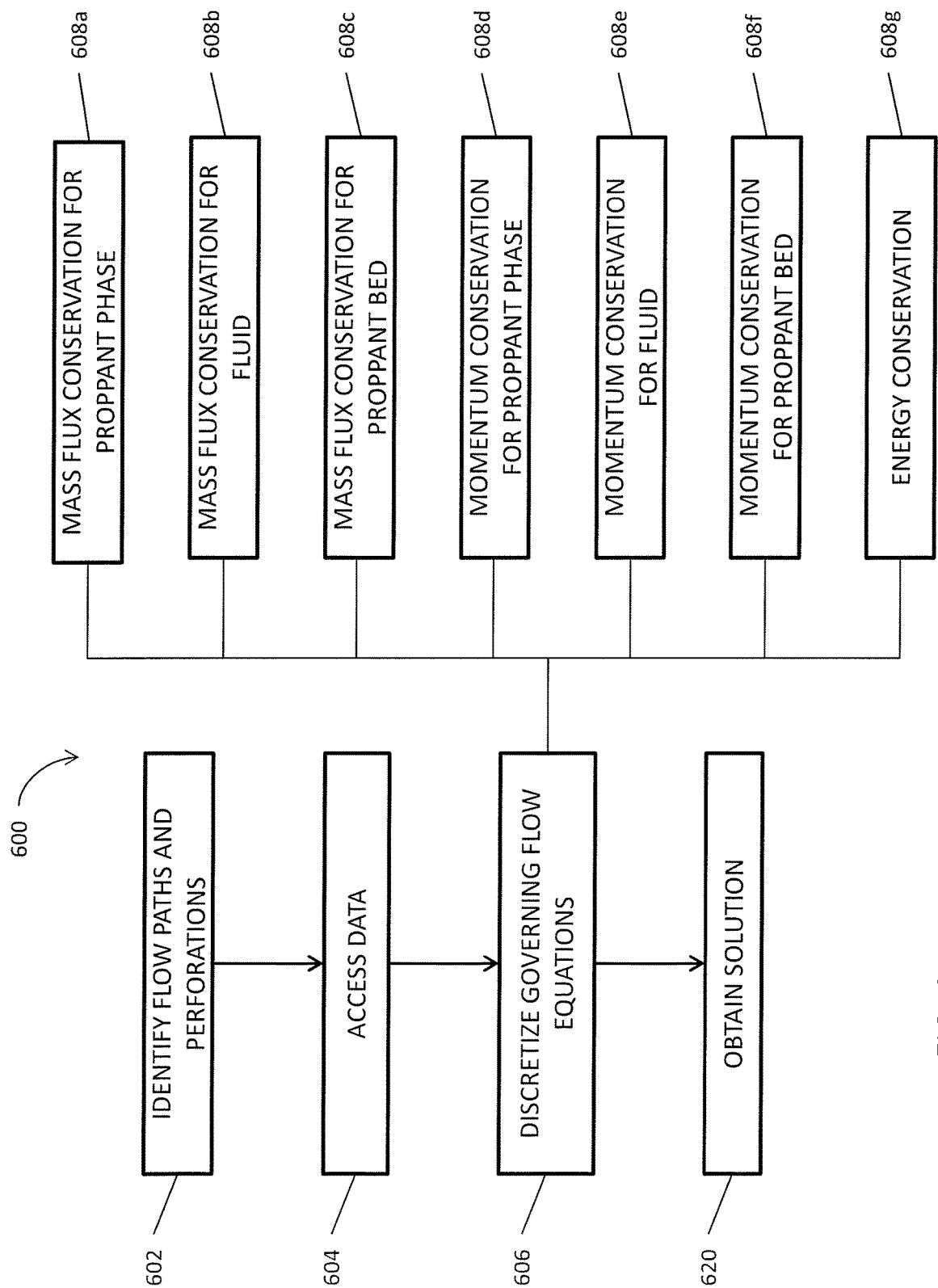
FIG. 6 is a flow chart showing a one-dimensional model for proppant transport.

FIG. 6 is a flow chart showing an example process 600 for simulating fluid and proppant flow in a wellbore. All or part of the example process 600 may be computer-implemented, for example, using the features and attributes of the example computing system 200 shown in FIG. 2 or other computing systems. The process 600, individual operations of the process 600, or groups of operations may be iterated or performed in parallel, in series, or in another manner. In some cases, the process 600 may include the same, additional, fewer, or different operations performed in the same or a different order.

The example process 600 can be used to simulate the flow of various fluids and fluid mixtures. In some cases, the process 600 is used to simulate one or more well system fluids, proppants, or fluid mixtures. Here, the term "well system fluid" is used broadly to encompass a wide variety of fluids that may be found in or near, or may be used in connection with, a well system. Well system fluids can include one or more native fluids that reside in a subterranean region (e.g., brine, oil, natural gas, etc.), one or more fluids that have been or will be injected into a subterranean region (e.g., fracturing fluids, treatment fluids, proppant-fluid mixtures, etc.), one or more fluids that have been or will be communicated within a wellbore or within one or more tools installed in the well bore (e.g., drilling fluids, hydraulic fluids, etc.), and other types of fluids. The example process 600 can also simulate multiple types of fluid flowing within the same system.

The example process 600 can simulate fluid flow based on a one-dimensional proppant transport flow model. The proppant transport flow model can include nodes or points of a discretized one-dimensional flow path. For example, the process 600 can use the example flow model 500 shown in FIG. 5, or another type of flow model. The one-dimensional proppant transport flow model can also include a proppant momentum conservation model, a mass flux conservation model, or a combination of these and other types of conservation models. The proppant transport flow model can also include governing equations and associated variables for each of the nodes. For example, the flow model can include the variables shown in FIG. 5, and the proppant transport flow model can include one or more of the example Equations (1) to (37), shown above. The flow model can include other types of variables or equations.

At 602, flow paths and perforations are identified. In some cases, the flow paths are identified as flow paths in a wellbore, and perforations along the flow paths are identified. Identifying the flow paths can include generating a discretized representation of the flow paths. The discretized representation can consist of one or more flow paths, grid points, nodes, staggered points, or groups of nodes, such as those shown in FIG. 5. In some cases, perforations are identified by individual groups of nodes comprising an upstream node and a downstream node. The example model can require fewer grid points compared to some conventional approaches. In some implementations, a flow path that does not include perforations can be modeled. The flow path can include multiple intersecting branches, multiple fluid domains, or a combination of these and other features.

At 604, model data are accessed. The model data can be based on the discretization of governing flow equations. The model data can include equations, mathematical expressions, data structures, or other types of information. The model data can include physical data or estimated data, such as values of variables associated with the model or equations, expressions, or information therein. For example, the model data can include values or estimates of velocity, momentum, mass, area, etc.

At 606, the governing equations are discretized. The governing flow equations can be provided by the proppant transport flow model or another source. The governing flow equations can include, for example, Navier-Stokes equations, Darcy flow equations, convection or diffusion equations, continuity equations, momentum conservation equations, and others. The governing equations can be discretized according to a finite difference technique or another discretization method. The governing equations can include mass flux conservation equations for the proppant phase (608*a*), fluid (608*b*), and proppant bed (608*c*), such as example Equations (1), (3), and (5), respectively. The governing equations can further include momentum conservation balance equations for the proppant phase (608*d*), the fluid (608*e*), and the proppant bed (608*f*), such as example Equations (2), (4), and (6), respectively. Temperature and energy effects may also be taken into consideration by including equations directed to energy conservation (608*g*).

At 620, a solution is obtained. The solution can be obtained based on a set of discretized governing flow equations, such as those associated with step 606. In some implementations, the discretized governing flow equations are solved numerically. For example, an iterative method such as Newton's method can be used to solve the equations and obtain the solution. In some instances, an implicit time solution can be calculated. The solution can indicate one or more flow velocities, pressures, or values for other variables at each discretized location on the flow paths. The application of the finite difference method with a staggered grid approach can be used to solve for fluid transport, proppant transport, and temperature computations in a wellbore with perforations.

In some embodiments, multiple simulations, such as the simulation illustrated in FIG. 6, may be run for a given wellbore. By varying one or more parameters for each simulation and comparing the resulting solutions, a well treatment may be optimized. For example, multiple simulations may be run with proppant-fluid mixtures having differing properties. These properties may include but are not limited to fluid density, proppant density, volume percentage of proppant in the proppant-fluid mixture, proppant material, proppant size, and fluid rheology. Other examples of parameters that may be varied between simulations include those related to injection of the proppant-fluid mixture into the wellbore. For example, simulations may be run with varying injection times, pressures, and volumes.

Fluid flow simulation systems in accordance with this disclosure may operate to solve forward modelling problems, i.e., the fluid flow simulation system may be provided with model parameters and in turn generate result data. Fluid flow simulation systems in accordance with this disclosure may also operate to solve inverse modelling problems where result data is provided to the fluid flow simulation system and the fluid flow simulation system returns model parameters capable of producing the result data. For example, a fluid flow simulation system may be provided with data corresponding to a desired proppant penetration, or similar end result, and in turn provide one or more proppant-fluid mixtures and/or injection parameters suitable for achieving the desired result.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

What is claimed is:

1. A method, comprising:
    generating a one-dimensional flow model for a flow of a proppant-fluid mixture along a flow path, wherein the one-dimensional flow model is operable to model the dynamics of a fluid, a proppant phase, and a proppant bed, wherein the fluid has one or more viscoelastic properties,
    the one-dimensional flow model further comprising:
        a fluid momentum conservation model,
        a proppant momentum conservation model, and
        a proppant bed momentum conservation model,
    wherein the proppant momentum conservation model is based on the equation:

$$\frac{\partial}{\partial t}(\rho^{(p)} A \phi u^{(p)}) + \frac{\partial}{\partial x}\left[\rho^{(p)} A \phi (u^{(p)})^2\right] + A\phi \frac{\partial p}{\partial x} - \rho^{(p)} A \phi g \cos\theta + u^{(p)} \dot{m}^{(p)} + \tau^{(fp)} - \tau^{(pb)} = 0$$

where
$\rho^{(p)}$ represents density of the proppant,
A represents an effective cross-section of the flow path,
$\phi$ represents the volume fraction of proppant in the proppant-fluid mixture,
$u^{(p)}$ represents velocity of the proppant phase, p represents pressure,
g represents acceleration due to gravity,
θ represents an inclination angle of the flow path with respect to gravity,
$\dot{m}^{(p)}$ represents mass flux of the proppant phase caused by settling and resuspension of the proppant phase,
$\tau^{(fp)}$ represents shearing force between the fluid and the proppant phase, and
$\tau^{(pb)}$ represents shearing force between the proppant phase and the proppant bed;

determining, by operation of a data processing apparatus, one or more parameters of a wellbore operation based, at least in part, on the one-dimensional flow model;

selecting the proppant-fluid mixture based on the one or more parameters; and injecting the proppant-fluid mixture into a subterranean region.

2. The method of claim 1, further comprising:
selecting an injection parameter based on the one or more parameters; and
injecting the proppant-fluid mixture into the subterranean region based on the injection parameter.

3. The method of claim 1, wherein at least one of the fluid momentum conservation model, the proppant momentum conservation model, and the proppant bed momentum conservation model account for settling and resuspension effects of the proppant phase normal to the flow.

4. The method of claim 1, wherein the proppant bed momentum conservation model accounts for at least one of axial interphase shearing force along the flow path induced by resuspension of the proppant phase, axial interphase shearing force along the flow path induced by settling of the proppant phase, and momentum transfer to the proppant bed due to proppant impinging the proppant bed.

5. The method of claim 1, wherein at least one of the fluid momentum conservation model, the proppant momentum conservation model, and the proppant bed momentum conservation model account for momentum transfer between any two of the fluid, the proppant, and the proppant bed.

6. The method of claim 1, wherein the one-dimensional proppant transport flow model represents flow of the proppant-fluid mixture in at least one of a wellbore or a fracture in a subterranean rock formation.

7. The method of claim 1, wherein the one-dimensional proppant transport flow model includes a finite difference model and a plurality of discretized governing flow equations, and operating the one-dimensional proppant transport flow model comprises solving the discretized governing flow equations.

8. The method of claim 1, wherein the one-dimensional proppant transport flow model further comprises a mass flux conservation model wherein the mass flux conservation model accounts for mass flux of at least one of the fluid, the proppant bed, and the proppant phase.

9. The method of claim 1, wherein the fluid momentum conservation model accounts for viscoelastic effects of the viscoelastic fluid based on the equation:

$$\frac{\partial}{\partial t}[\rho^{(f)}A(1-\phi)u^{(f)}] + \frac{\partial}{\partial x}[\rho^{(f)}A(1-\phi)(u^{(f)})^2] +$$
$$A(1-\phi)\frac{\partial p}{\partial x} - \frac{\partial}{\partial x}[A(1-\phi)\sigma_{xx}^{(f)}] + \rho^{(f)}A(1-\phi)f^{(f)} -$$
$$\rho^{(f)}A(1-\phi)g\cos\theta + u^{(f)}\dot{m}^{(f)} - \tau^{(fp)} - \tau^{(fb)} = 0$$

where
$\rho^{(f)}$ represents density of the fluid,
A represents an effective cross-section of the flow path,
φ represents the volume fraction of proppant in the proppant-fluid mixture,
$u^{(f)}$ represents velocity of the fluid,
p represents pressure,
$\sigma_{xx}^{(f)}$ represents fluid viscoelastic stress along the flow path,
$f^{(f)}$ represents friction losses of the fluid,
g represents acceleration due to gravity,
θ represents an inclination angle of the flow path with respect to gravity,
$\dot{m}^{(f)}$ represents mass flux of the fluid caused by settling and resuspension of the proppant phase,
$\tau^{(fp)}$ represents interphase momentum transfer forces between the fluid and the proppant phase, and
$\tau^{(fb)}$ represents interphase shearing force between the fluid and the proppant bed.

10. The method of claim 1, wherein the proppant bed momentum conservation model accounts for viscoelastic effects of the viscoelastic fluid based on the equation:

$$\frac{\partial}{\partial t}(\rho^{(b)}A^{(b)}u^{(b)}) + \frac{\partial}{\partial x}[\rho^{(b)}A^{(b)}(u^{(b)})^2] + A^{(b)}\frac{\partial p}{\partial x} - \frac{\partial}{\partial x}(A^{(b)}\sigma_{xx}^{(b)}) +$$
$$\rho^{(b)}A^{(b)}f^{(b)} - \rho^{(b)}A^{(b)}g\cos\theta - u^{(b)}(\dot{m}^{(f)} + \dot{m}^{(p)}) + \tau^{(fb)} +$$
$$\tau^{(pb)} + \rho^{(b)}[(1-\phi)u^{(f)} + \phi u^{(p)}]\left[(1-\phi)\frac{\rho^{(f)}}{\rho^{(p)}} + \phi\right]v_{settling} = 0$$

where
$\rho^{(b)}$ represents density of the proppant bed,
$\rho^{(f)}$ represents density of the fluid,
$A^{(b)}$ represents a cross-sectional area of the proppant bed,
φ represents the volume fraction of proppant in the proppant-fluid mixture,
$u^{(b)}$ represents velocity of the proppant bed,
$u^{(f)}$ represents velocity of the fluid,
p represents pressure,
$\sigma_{xx}^{(b)}$ represents proppant bed viscoelastic stress along the flow path,
$f^{(b)}$ represents friction losses of the proppant bed,
g represents acceleration due to gravity,
θ represents an inclination angle of the flow path with respect to gravity,
$\dot{m}^{(f)}$ represents mass flux of the fluid caused by settling and resuspension of the proppant phase,
$\dot{m}^{(p)}$ represents mass flux of the proppant phase caused by settling and resuspension of the proppant phase,
$\tau^{(fb)}$ represents interphase momentum transfer forces between the fluid and the proppant bed,
$\tau^{(pb)}$ represents interphase momentum transfer forces between the proppant phase and the proppant bed, and
$v_{settling}$ represents velocity at which settling proppant impinges the proppant bed.

11. A non-transitory computer-readable medium storing instructions that, when executed by a data processing apparatus, perform operations comprising:
generating a one-dimensional flow model for flow of a proppant-fluid mixture along a flow path, wherein the one-dimensional flow model is operable to model the dynamics of a fluid, a proppant phase, and a proppant bed, wherein the fluid has one or more viscoelastic properties, the one-dimensional flow model further comprising
  a fluid momentum conservation model,
  a proppant momentum conservation model, and
  a proppant bed momentum conservation model,
  wherein the proppant momentum conservation model is based on the equation:

$$\partial/\partial t(\rho^{(p)}A\phi u^{(p)}) + \partial/\partial x[\rho^{(p)}A\phi(u^{(p)})^2] + A\phi \partial p/\partial x - \rho^{(p)}A\phi g \cos\theta + u^{(p)}\dot{m}^{(p)} + \tau^{(fp)} - \tau^{(pb)} = 0$$

where
  $\rho^{(p)}$ represents density of the proppant,
  A represents an effective cross-section of the flow path,
  $\phi$ represents the volume fraction of proppant in the proppant-fluid mixture,
  $u^{(p)}$ represents velocity of the proppant phase,
  p represents pressure,
  g represents acceleration due to gravity,
  $\theta$ represents an inclination angle of the flow path with respect to gravity,
  $\dot{m}^{(p)}$ represents mass flux of the proppant phase caused by settling and resuspension of the proppant phase,
  $\tau^{(fp)}$ represents shearing force between the fluid and the proppant phase, and
  $\tau^{(pb)}$ represents shearing force between the proppant phase and the proppant bed;
determining one or more parameters of a wellbore operation based, at least in part, on the one-dimensional flow model;
selecting the proppant-fluid mixture based on the one or more parameters; and
injecting the proppant-fluid mixture into a subterranean region.

12. The computer-readable medium of claim 11, wherein the operations performed further comprise determining an injection parameter based on a result of operating the model.

13. The computer-readable medium of claim 11, wherein the one-dimensional proppant transport flow model represents flow of the proppant-fluid mixture in at least one of a wellbore or a fracture in a subterranean rock formation.

14. The computer-readable medium of claim 11, wherein the fluid momentum conservation model accounts for viscoelastic effects of the viscoelastic fluid based on the equation:

$$\partial/\partial t[\rho^{(f)}A(1-\phi)u^{(f)}] + \partial/\partial x[\rho^{(f)}A(1-\phi)(u^{(f)})^2] + A(1-\phi)\partial p/\partial x - \partial/\partial x[A(1-\phi)\sigma_{xx}^{(f)}] + \rho^{(f)}A(1-\phi)f^{(f)} - \rho^{(f)}A(1-\phi)g\cos\theta + u^{(f)}\dot{m}^{(f)} - \tau^{(fp)} - \tau^{(fb)} = 0$$

where
  $\rho^{(f)}$ represents density of the fluid,
  A represents an effective cross-section of the flow path,
  $\phi$ represents the volume fraction of proppant in the proppant-fluid mixture,
  $u^{(f)}$ represents velocity of the fluid,
  p represents pressure,
  $\sigma_{xx}^{(f)}$ represents fluid viscoelastic stress along the flow path,
  $f^{(f)}$ represents friction losses of the fluid,
  g represents acceleration due to gravity,
  $\theta$ represents an inclination angle of the flow path with respect to gravity,
  $\dot{m}^{(f)}$ represents mass flux of the fluid caused by settling and resuspension of the proppant phase,
  $\tau^{(fp)}$ represents interphase momentum transfer forces between the fluid and the proppant phase, and
  $\tau^{(fb)}$ represents interphase shearing force between the fluid and the proppant bed.

15. The computer-readable medium of claim 11, wherein the proppant bed momentum conservation model accounts for viscoelastic effects of the viscoelastic fluid based on the equation:

$$\partial/\partial t(\rho^{(b)}A^{(b)}u^{(b)}) + \partial/\partial x[\rho^{(b)}A^{(b)}(u^{(b)})^2] + A^{(b)}\partial p/\partial x - \partial/\partial x(A^{(b)}\sigma_{xx}^{(b)}) + \rho^{(b)}A^{(b)}f^{(b)} - \rho^{(b)}A^{(b)}g\cos\theta - u^{(b)}(\dot{m}^{(f)} + \dot{m}^{(p)}) + \tau^{(fb)} + \tau^{(pb)} + \rho^{(b)}[(1-\phi)u^{(f)} + \phi u^{(p)}][(1-\phi)\rho^{(f)}/\rho^{(p)} + \phi]v_{settling} = 0$$

where
  $\rho^{(b)}$ represents density of the proppant bed,
  $\rho^{(f)}$ represents density of the fluid,
  $A^{(b)}$ represents a cross-sectional area of the proppant bed,
  $\phi$ represents the volume fraction of proppant in the proppant-fluid mixture,
  $u^{(b)}$ represents velocity of the proppant bed,
  $u^{(f)}$ represents velocity of the fluid,
  p represents pressure,
  $\sigma_{xx}^{(b)}$ represents proppant bed viscoelastic stress along the flow path,
  $f^{(b)}$ represents friction losses of the proppant bed,
  g represents acceleration due to gravity,
  $\theta$ represents an inclination angle of the flow path with respect to gravity,
  $\dot{m}^{(f)}$ represents mass flux of the fluid caused by settling and resuspension of the proppant phase,
  $\dot{m}^{(p)}$ represents mass flux of the proppant phase caused by settling and resuspension of the proppant phase,
  $\tau^{(fb)}$ represents interphase momentum transfer forces between the fluid and the proppant bed,
  $\tau^{(pb)}$ represents interphase momentum transfer forces between the proppant phase and the proppant bed, and
  $v_{settling}$ represents velocity at which settling proppant impinges the proppant bed.

16. The computer-readable medium of claim 11, wherein the fluid momentum conservation model, the proppant bed momentum conservation model, and the proppant momentum conservation model account for settling and resuspension of the proppant phase.

17. The computer-readable medium of claim 11, wherein the fluid momentum conservation model, the proppant bed momentum conservation model, and the proppant momentum conservation model account for interphase momentum transfer between any two of the proppant phase, the fluid, and the proppant bed.

18. A proppant transport flow modeling system comprising one or more computers that include:
  a momentum conservation module operable to model fluid momentum, proppant momentum, and proppant bed momentum in a one-dimensional proppant transport flow model, the one-dimensional proppant transport flow model representing flow of a proppant phase, a fluid, and a proppant bed along a flow path, wherein the fluid has one or more viscoelastic properties,
  the one-dimensional flow model further comprising
    a fluid momentum conservation model,
    a proppant momentum conservation model, and
    a proppant bed momentum conservation model,
    wherein the proppant momentum conservation model is based on the equation:

$$\frac{\partial}{\partial t}(\rho^{(p)}A\phi u^{(p)}) + \frac{\partial}{\partial x}\left[\rho^{(p)}A\phi (u^{(p)})^2\right] +$$

-continued $$A\phi\frac{\partial p}{\partial x} - \rho^{(p)}A\phi g\cos\theta + u^{(p)}\dot{m}^{(p)} + \tau^{(fp)} - \tau^{(pb)} = 0$$

where $\rho^{(p)}$ represents density of the proppant,

A represents an effective cross-section of the flow path, $\phi$ represents the volume fraction of proppant in the proppant-fluid mixture, $u^{(p)}$ represents velocity of the proppant phase, p represents pressure, g represents acceleration due to gravity, $\theta$ represents an inclination angle of the flow path with respect to gravity, $\dot{m}^{(p)}$ represents mass flux of the proppant phase caused by settling and resuspension of the proppant phase, $\tau^{(fp)}$ represents shearing force between the fluid and the proppant phase, and $\tau^{(pb)}$ represents shearing force between the proppant phase and the proppant bed;

a computational module operable to compute a value of a flow variable based on the fluid momentum, the proppant momentum, and the proppant bed momentum modeled by the momentum conservation module, wherein a proppant-fluid mixture is selected based on the flow variable and injected into a subterranean region.

19. The proppant transport flow modeling system of claim 18, wherein the momentum conservation module accounts for interphase momentum transfer between any two of the fluid, the proppant phase, and the proppant bed.

20. The proppant transport flow modeling system of claim 18, wherein the momentum conservation module accounts for settling and resuspension of the proppant phase.

21. The proppant transport flow modeling system of claim 18, wherein the one or more computers include a mass flux conservation module operable to conserve mass flux of at least one of the proppant phase, the fluid, and the proppant bed.

22. The proppant transport flow modeling system of claim 18, wherein the fluid momentum conservation model accounts for viscoelastic effects of the viscoelastic fluid based on the equation:

$$\frac{\partial}{\partial t}[\rho^{(f)}A(1-\phi)u^{(f)}] + \frac{\partial}{\partial x}[\rho^{(f)}A(1-\phi)(u^{(f)})^2] +$$
$$A(1-\phi)\frac{\partial p}{\partial x} - \frac{\partial}{\partial x}[A(1-\phi)\sigma_{xx}^{(f)}] + \rho^{(f)}A(1-\phi)f^{(f)} -$$
$$\rho^{(f)}A(1-\phi)g\cos\theta + u^{(f)}\dot{m}^{(f)} - \tau^{(fp)} - \tau^{(fb)} = 0$$

where $\rho^{(f)}$ represents density of the fluid,

A represents an effective cross-section of the flow path, $\phi$ represents the volume fraction of proppant in the proppant-fluid mixture, $u^{(f)}$ represents velocity of the fluid, p represents pressure, $\sigma_{xx}^{(f)}$ represents fluid viscoelastic stress along the flow path, $f^{(f)}$ represents friction losses of the fluid, g represents acceleration due to gravity, $\theta$ represents an inclination angle of the flow path with respect to gravity, $\dot{m}^{(f)}$ represents mass flux of the fluid caused by settling and resuspension of the proppant phase, $\tau^{(fp)}$ represents interphase momentum transfer forces between the fluid and the proppant phase, and $\tau^{(fb)}$ represents interphase shearing force between the fluid and the proppant bed.

* * * * *